Nov. 25, 1930.                H. V. CRAWFORD                    1,783,036
               CONTROL MECHANISM FOR CENTRIFUGAL COMPRESSORS
                        AND METHOD OF OPERATING THE SAME
                            Filed March 22, 1928
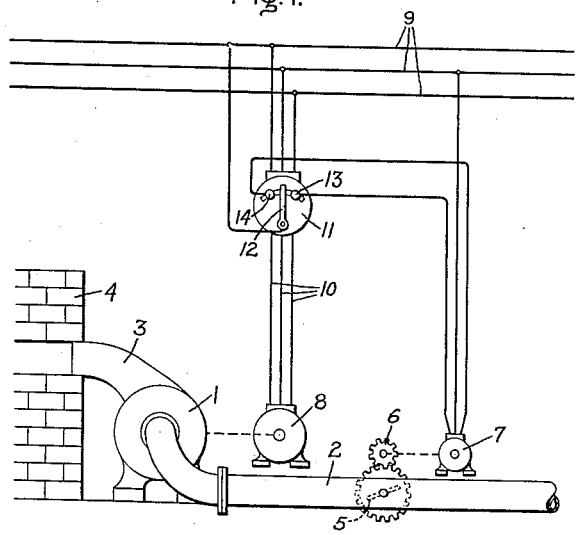
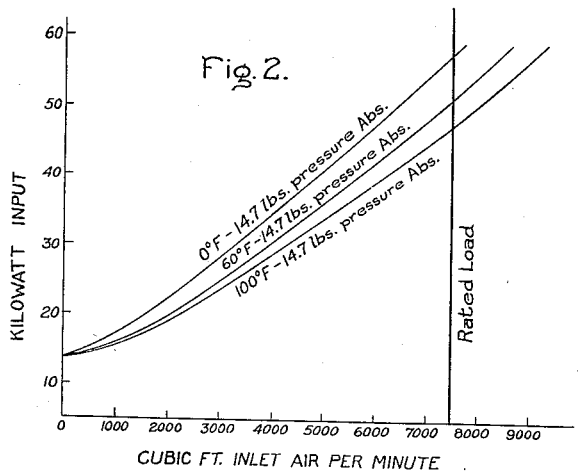
Inventor:
Henry V. Crawford,
by Charles E. Tullar
His Attorney Patented Nov. 25, 1930

1,783,036

UNITED STATES PATENT OFFICE

HENRY V. CRAWFORD, OF SCHENECTADY, NEW YORK, ASSIGNOR TO GENERAL ELECTRIC COMPANY, A CORPORATION OF NEW YORK

CONTROL MECHANISM FOR CENTRIFUGAL COMPRESSORS AND METHOD OF OPERATING THE SAME

Application filed March 22, 1928. Serial No. 263,932.

The present invention relates to the control of centrifugal compressors driven by substantially constant speed electric motors wherein the compressor is required to deliver a constant weight of air against a variable discharge resistance and wherein the control is effected by varying the effective area of the compressor pipe line, a thing accomplished ordinarily by means of a blast gate or valve located in the pipe line of the compressor, preferably in the inlet conduit, the blast gate being adjusted with increase and decrease in the variable discharge resistance to maintain at a desired value the total resistances through the pipe line.

An application of my invention is in connection with cupola compressors or blowers such as are utilized in foundries. In the operation of a cupola, a constant weight of oxygen and hence a constant weight of air is required to carry on the process. However, it is not practical to actually weigh the air and therefore it has been the practice in many instances to measure the volume of air in an approximate manner, the assumption being made that a constant volume of air meant a constant weight of air. However, this is not the case because the weight of a unit volume of air changes considerably with atmospheric conditions and especially with the temperature of the air. It follows, therefore, that if in the use of a compressor or blower for supplying air to a cupola or the like, means are provided to maintain constant the volume of air, it does not result that the correct weight of air is being supplied to the cupola.

The object of the present invention is to provide an improved method and arrangement for controlling a centrifugal compressor or blower driven by a substantially constant speed electric motor whereby I am enabled to adjust a blast gate in the pipe line or other means for varying the effective area of the pipe line so as to supply a constant weight of air against a variable discharge resistance, such as a cupola, irrespective of changes in resistance offered by the variable discharge resistance or changes in atmospheric conditions, and for a consideration of what I believe to be novel and my invention, attention is directed to the accompanying description and the claims appended thereto.

In the drawing, Fig. 1 is a diagrammatic view of an installation comprising a motor-driven centrifugal compressor embodying my invention, and Fig. 2 is a diagram showing the motor and compressor characteristics.

It is known that a substantially constant speed electric motor has certain load characteristics. Likewise it is known that a substantially constant speed centrifugal compressor or blower has certain load characteristics, the volume of air delivered varying with changes in the resistance offered by the suction and discharge conduits and with the density of the air being pumped.

I have discovered that certain centrifugal compressor or blowers driven by substantially constant speed motors, have characteristics such that within the range of normal operation the effect of increase of volume on the electric power input and the effect of atmospheric conditions on the power input is such that the power input varies only with the weight of air. This weight is found by multiplying any existing volume by any existing density due to any existing atmospheric conditions. Such a compressor gives a given power input for a given product of volume times density, regardless of the individual values of these two factors. With such a motor-driven centrifugal compressor, the power input varies in the same ratio as the weight of air.

According to my invention, I select such a motor-driven centrifugal compressor or blower and by adjusting the blast gate or other means to maintain constant power input to the motor, the result is obtained that the compressor delivers a constant weight of air. I then provide means whereby a constant power input may be maintained on the motor. As a result of my invention, therefore, it becomes necessary merely to maintain a constant power input to the motor in order to maintain a constant weight output from the blower.

Referring to the drawing, 1 indicates a centrifugal compressor or blower having a suction conduit 2 and a discharge conduit 3. In the present instant, it is shown as supplying air to a cupola 4. In the suction conduit is a blast gate 5 which is moved toward closed and open positions to decrease and increase the resistance offered to the flow of air through the pipe line. The blast gate 5 is positioned through suitable gearing 6, by means of a reversible electric motor 7. 8 indicates a substantially constant speed electric motor which drives the centrifugal compressor or blower 1, an alternating current motor being indicated in the present instant. It is connected to a source of current 9 by lead wires 10. When the motor 8 is operated, the centrifugal compressor or blower 1 is driven at substantially constant speed. If it is desired to increase the amount of air being delivered by the blower, the blast gate 5 is opened somewhat, while if it is desired to decrease the amount of air being delivered, the blast gate 5 is closed somewhat.

With an arrangement as illustrated in the drawing it will be seen that there are two variables which determine the amount of air delivered by the centrifugal compressor or blower. One variable is the resistance which the cupola 4 offers to the flow of air from conduit 3, and the other is the resistance which the blast gate offers to the flow of air through suction conduit 2. Assuming that it is desired to maintain constant operating conditions, it will be clear that if the resistance to flow from conduit 3 increases, then to restore conditions to normal, the blast gate 5 should be opened somewhat in order to decrease the resistance offered to the flow of air through conduit 2 by an amount sufficient to compensate for the increased resistance offered to the flow of air from conduit 3. In a similar manner, if the resistance to the flow of air from conduit 3 decreases, then to maintain conditions the same, blast gate 5 should be closed somewhat in order to increase the resistance to the flow of air through conduit 2.

11 indicates a contact-making measuring instrument which measures the power input to the alternating current motor 8. If the source of power 9 is of constant potential, the measuring instrument 11 may be in the form of a contact-making ammeter since with constant potential the current is a measure of the total power. However, if desired, instrument 11 may be in the form of a contact-making wattmeter. The contact pointer of measuring instrument 11 is indicated at 12. On each side of it are located adjustable contacts 13 and 14. The contacts 13 and 14 are adjusted so that when the power input to the motor 8 is of the desired value, pointer 12 stands midway between them. If the power input increases, contact pointer 12 will move into engagement with one of the contacts 13 or 14 to operate motor 7 in a direction to close blast gate 5 somewhat, thereby decreasing the load on the centrifugal compressor or blower 1, so as to bring the power input of motor 8 back to normal value, while if the power input to motor 8 decreases contact pointer 12 engages the other contact to operate motor 7 in a direction to open blast gate 5 somewhat, thereby increasing the load on centrifugal compressor or blower 1 to bring the power input of the motor back to normal value.

With this arrangement, the power input to the motor is maintained automatically at a constant value and the result is obtained, because of the load characteristics of the motor and centrifugal compressor or blower, that within the regions of normal operation of the motor-driven set, a constant weight of air is delivered by the centrifugal compressor or blower.

In the operation of the arrangement illustrated, if the resistance to flow through the cupola increases, then due to the resulting decrease in the load on the centrifugal compressor, the contact-making measuring instrument 11 will function to effect an opening movement of the blast gate 5 so as to bring the power input to the motor back to normal value, while, if the resistance to flow through the cupola 4 decreases, thereby increasing the load on the centrifugal compressor or blower, then the contact-making measuring instrument 11 will function to effect a closing movement of the blast gate 5 thereby again bringing the power input to the motor back to the normal value.

If the density of the air increases or decreases, which means a greater or lesser weight of air per unit volume, the load on the compressor is increased or decreased correspondingly, and hence the power input to the motor, the apparatus functions as just described to adjust the blast gate to bring the power input to the motor back to is normal value. As stated above, the characteristics of the motor and compressor are such that this adjustment would bring the weight of air to a value the same as that which it was before the density changed.

My invention, insofar as the method is concerned, may be carried out manually, the blast gate being adjusted by hand in accordance with the readings of the power input measuring instrument.

Fig. 2 of the drawing comprises curves showing one example of electric motor and compressor characteristics which produce the result set forth herein, values for several different temperatures being plotted.

In Fig. 2, kilowatt input to the motor is plotted against cubic feet of inlet air per minute, the three curves shown being for air at 0° F., 60° F. and 100° F. at standard air pressure of 14.7 pounds. Taking from this diagram values of volume at the several temperatures given, for a kilowatt load in the vicinity of the rated load line, it will be found that in each case the volume corresponds to the same weight of air.

It is to be understood that by the term "constant", as used in the specification and claims, I do not mean a value as nearly constant as can be obtained but I mean a value sufficiently constant for satisfactory operation from a practical standpoint and whereby the advantages of the invention may be obtained.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A centrifugal compressor having a blast gate, a substantially constant speed electric motor for driving the compressor, said compressor and motor having characteristics such that the power supplied to the motor varies, within the region of normal operation, substantially in the same ratio as the weight of air delivered by the compressor, and automatic means responsive to the power supplied to the motor for operating said blast gate to maintain constant power input to the motor and thereby supply air at a constant weight rate.

2. A centrifugal compressor having a blast gate, a substantially constant speed electric motor for driving the compressor, said compressor and motor having characteristics such that the power supplied to the motor varies, within the region of normal operation, substantially in the same ratio as the weight of air delivered by the compressor, an instrument responsive to the power supplied to the motor, and means controlled by said instrument for operating said blast gate so as to maintain constant power input to the motor and thereby supply air at a constant weight rate.

3. The method of delivering air at a predetermined weight rate by means of a substantially constant speed electric motor driven centrifugal compressor set having characteristics such that the power supplied to the motor varies, within the region of normal operation, substantially with the rate at which air is delivered by the compressor, which comprises measuring the electric power consumed by the motor in driving the compressor and varying the effective area of a compressor pipe line in accordance with the power consumption of the driving motor.

4. A centrifugal compressor having a pipe line, means for varying the effective area of said pipe line, a substantially constant speed electric motor for driving the compressor, said compressor and motor having characteristics such that the power supplied to the motor varies, within the region of normal operation, substantially in the same ratio as the weight of air delivered by the compressor, and automatic means responsive to the power supplied to the motor for operating said first named means to maintain constant power input to the motor and thereby supply air at a constant weight rate.

In witness whereof, I have hereunto set my hand this 21st day of March, 1928.

HENRY V. CRAWFORD.